United States Patent
Takeda et al.

(10) Patent No.: US 10,498,270 B2
(45) Date of Patent: Dec. 3, 2019

(54) CONTROL DEVICE FOR STEPPING MOTOR AND CONTROL METHOD FOR STEPPING MOTOR

(71) Applicant: Minebea Mitsumi Inc., Nagano (JP)

(72) Inventors: Koichi Takeda, Fukuroi (JP); Kazuo Takada, Kosai (JP); Shigeki Miyaji, Hamamatsu (JP); Kei Yamazaki, Ota-ku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/945,867

(22) Filed: Apr. 5, 2018

(65) Prior Publication Data
US 2018/0294754 A1   Oct. 11, 2018

(30) Foreign Application Priority Data
Apr. 11, 2017 (JP) .................. 2017-078421

(51) Int. Cl.
*H02P 8/12* (2006.01)
*H02P 8/08* (2006.01)

(52) U.S. Cl.
CPC . *H02P 8/12* (2013.01); *H02P 8/08* (2013.01)

(58) Field of Classification Search
CPC ................. H02P 8/12; H02P 1/00; H02P 3/00
See application file for complete search history.

(56) References Cited

U.S. PATENT DOCUMENTS

| | | | | |
|---|---|---|---|---|
| 5,198,741 A | * | 3/1993 | Shinada | H02P 8/22 318/685 |
| 6,806,675 B2 | * | 10/2004 | Wang | H02P 8/12 318/432 |
| 9,397,597 B2 | * | 7/2016 | Qu | H02P 8/12 |
| 2015/0042258 A1 | * | 2/2015 | Takada | H02P 8/10 318/696 |

FOREIGN PATENT DOCUMENTS

| | | |
|---|---|---|
| JP | 61-240846 A | 10/1986 |
| JP | 2005-261023 A | 9/2005 |
| JP | 2012-016122 A | 1/2012 |
| JP | 2015-035926 A | 2/2015 |

OTHER PUBLICATIONS

Japanese Office Action dated Aug. 26, 2019 for corresponding Japanese Application No. 2017-078421 and English translation.

* cited by examiner

*Primary Examiner* — Eduardo Colon Santana
*Assistant Examiner* — Said Bouziane
(74) *Attorney, Agent, or Firm* — Pearne & Gordon LLP (57) ABSTRACT

A control device for a stepping motor gradually increases an absolute value of the excitation current in phase A from when the start until the end of the hold period such that the amount of change in the excitation current per unit time is smaller than or equal to a first predetermined value. From the start of the hold period until a predetermined time elapses, an absolute value of the excitation current in phase B gradually increases such that the amount of change in the excitation current per unit time is smaller than or equal to the first predetermined value. By the end of the hold period after the predetermined time has elapsed, the excitation current in phase B reaches zero. When the hold period ends, one-phase excitation operation starts and the excitation current flows in phase A first with the same polarity as at the end of the hold period.

6 Claims, 9 Drawing Sheets

CONTROL DEVICE FOR STEPPING MOTOR AND CONTROL METHOD FOR STEPPING MOTOR

CROSS REFERENCE TO RELATED APPLICATIONS

This application claims the benefit of Japanese Patent Application No. 2017-078421, filed Apr. 11, 2017, which is hereby incorporated by reference in its entirety.

BACKGROUND

Technical Field

The present disclosure relates to a control device for a stepping motor and a control method for a stepping motor, and particularly relates to a control device for a stepping motor and a control method for a stepping motor configured to move a rotor to an initial position before transitioning to normal driving at the startup.

Background

A stepping motor magnetizes a stator by causing an excitation current to flow in multiple coils to drive a rotor to rotate in steps. Upon startup of the stepping motor, a holding current for attracting the rotor positioned at an arbitrary position to a position (initial position) facing the stator is caused to flow in the coils, and after the vibration of the rotor at the initial position stops, a driving current is applied to the coils, whereby the normal driving is performed. Thus, rotor locking operation is performed before the normal driving is performed, and it is possible to prevent hunting of the stepping motor to surely start-up the stepping motor.

Incidentally, in the stepping motor, when the rotor locking operation is performed, if the holding current is suddenly applied to the coils, vibration sound and impact sound are generated.

Japanese Patent Application Laid-Open No. 2012-016122 discloses that during a hold period at a startup of a stepping motor, an excitation current flowing through coils to move a rotor to a predetermined initial position is gradually increased such that the amount of change in the excitation current per unit time is smaller than or equal to a predetermined value. According to such a control method, since the rotor of the stepping motor slowly moves to the initial position at the startup, it is possible to suppress generation of vibration sound and impact sound.

SUMMARY

Incidentally, in a control method for a stepping motor as described in Japanese Patent Application Laid-Open No. 2012-016122, the rotor locking operation is performed in a two-phase excitation state during the hold period. In this case, when the stepping motor is driven in a one-phase excitation state during normal driving, abnormal noise (vibration sound, noise, etc.) is generated in transitioning from the hold period to normal driving. That is, at this time, when the two-phase excitation state is switched to the one-phase excitation state, the rotor suddenly moves, whereby the abnormal noise is generated.

The present disclosure is related to providing a control device for a stepping motor and a control method for a stepping motor capable of suppressing a level of sound generated in association with driving of the motor.

In accordance with one aspect of the present disclosure, provided is a control device for a stepping motor configured to rotate a rotor by controlling excitation current in each of one phase and another phase of two-phase coils. The control device includes: a hold control unit configured to move the rotor of the stepping motor to a predetermined initial position during a hold period at a startup of the stepping motor; and a normal control unit configured to perform one-phase excitation operation of the stepping motor after the end of the hold period, wherein from when the hold period is started until the hold period ends, the hold control unit gradually increases an absolute value of the excitation current in the one phase such that the amount of change in the excitation current per unit time is smaller than or equal to a first predetermined value, from when the hold period is started until a predetermined time elapses, the hold control unit gradually increases an absolute value of the excitation current in the other phase such that the amount of change in the excitation current per unit time is smaller than or equal to the first predetermined value, and, by the end of the hold period after the predetermined time elapses, the hold control unit causes the excitation current in the other phase to reach zero, and wherein when the hold period ends, the normal control unit starts the one-phase excitation operation of the stepping motor such that the excitation current flows to the one phase first with the same polarity as at the end of the hold period.

Preferably, after the predetermined time elapses, the hold control unit gradually decreases the absolute value of the excitation current in the other phase such that the amount of change in the excitation current per unit time is smaller than or equal to a second predetermined value.

Preferably, the hold control unit controls the excitation current in the other phase such that the excitation current in the other phase reaches zero when the hold period ends.

Preferably, the hold control unit controls the excitation current in the other phase such that the excitation current in the other phase reaches zero before the hold period ends.

Preferably, the hold control unit performs control such that the absolute value of the excitation current in the one phase and the absolute value of the excitation current in the other phase are equal to each other until the predetermined time elapses.

In accordance with another aspect of the present disclosure, provided is a control method for a stepping motor to rotate a rotor by controlling an excitation current in each of one phase and another phase of two-phase coils. The method includes: a hold control step of moving the rotor of the stepping motor to a predetermined initial position during a hold period at a startup of the stepping motor, and a normal control step of performing one-phase excitation operation of the stepping motor after the end of the hold period, wherein the hold control step includes: from when the hold period is started until the hold period ends, gradually increasing an absolute value of the excitation current in the one phase such that the amount of change in the excitation current per unit time is smaller than or equal to a first predetermined value; by the time a predetermined time elapses, gradually increasing an absolute value of the excitation current in the other phase such that the amount of change in the excitation current per unit time is smaller than or equal to the first predetermined value; and by the end of the hold period after the predetermined time has elapsed since the start of the hold period, causing the excitation current in the other phase to reach zero, and wherein the normal control step includes, when the hold period ends, starting the one-phase excitation operation of the stepping motor such that the excitation current flows in the one phase first with the same polarity as at the end of the hold period.

In accordance with the present disclosure, it is possible to provide a control device for a stepping motor and a control method for a stepping motor capable of suppressing a level of sound generated in association with driving of the motor.

DETAILED DESCRIPTION

Hereinafter, a control device for a stepping motor according to an embodiment of the present disclosure will be described.

First Embodiment

Figure 1:
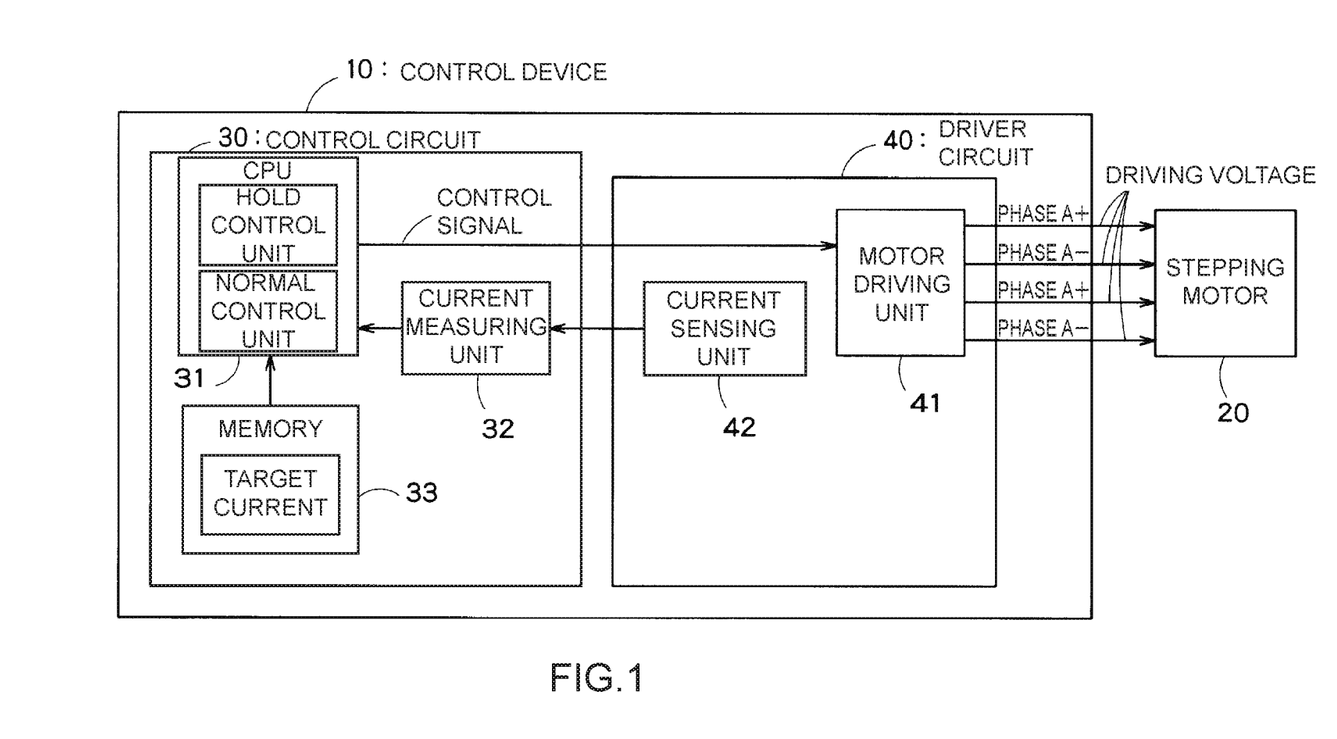
FIG. 1 is a block diagram showing a control device for a stepping motor according to a first embodiment of the present disclosure.

FIG. 1 is a block diagram showing a control device for a stepping motor according to a first embodiment of the present disclosure.

As shown in FIG. 1, a control device 10 supplies a driving voltage to a stepping motor 20, thereby driving the stepping motor 20.

The stepping motor 20 includes a rotor, a stator, and a plurality of coils (not shown) wound around the stator. The stepping motor 20 is, for example, the one including two-phase coils. That is, the stepping motor 20 includes coils of A-phase (an example of one phase) and B-phase (an example of another phase). The driving voltage is supplied from the control device 10 to the stepping motor 20 through lines of the A-phase (positive), the A-phase (negative), the B-phase (positive), and the B-phase (negative), or the like. In the present embodiment, the stepping motor 20 is used as, but not limited to, an actuator for automobile air conditioners.

The control device 10 mainly includes a control circuit (an example of a hold control unit, and an example of a normal control unit) 30 and a driver circuit 40. The driver circuit 40 applies the driving voltage to the coils of the stepping motor 20. The control circuit 30 controls the driver circuit 40, thereby controlling the driving voltage applied by the driver circuit 40. That is, the control device 10 applies the driving voltage to the two-phase coils of the stepping motor 20 to cause the excitation current to flow in the coils. The control device 10 rotates the rotor of the stepping motor 20 by controlling an excitation current in each of the A-phase and the B-phase of the two-phase coils. As described later, the control circuit 30 (more specifically, a CPU 31 described later) functions as the hold control unit configured to move the rotor of the stepping motor 20 to a predetermined initial position during a hold period at a startup of the stepping motor 20 and functions as the normal control unit configured to perform one-phase excitation operation of the stepping motor 20 after the end of the hold period. As the hold control unit, from when the hold period is started until the hold period ends, the control circuit 30 gradually increases an absolute value of the excitation current in the A-phase (an example of the one phase) such that the amount of change in the excitation current per unit time is smaller than or equal to a first predetermined value, from when the hold period is started until a predetermined time elapses, the control circuit 30 gradually increases an absolute value of the excitation current in the B-phase (an example of the other phase) such that the amount of change in the excitation current per unit time is smaller than or equal to the first predetermined value, and by the time the hold period ends after the predetermined time has elapsed, the control circuit 30 causes the excitation current in the B-phase to reach zero. Also, as the normal control unit, when the hold period ends, the control circuit 30 starts the one-phase excitation operation of the stepping motor 20 such that the excitation current flows in the A-phase first with the same polarity as at the end of the hold period.

The control circuit 30 includes a CPU (Central Processing Unit) 31, a current measuring unit 32, and a memory 33. The driver circuit 40 includes a motor driving unit 41 and a current sensing unit 42.

The current sensing unit 42 and the current measuring unit 32 detect a value of the excitation current flowing in each coil of the stepping motor 20. More specifically, the current sensing unit 42 causes the excitation current to flow to, for example, a shunt resistor and detects a voltage drop at the shunt resistor. Thereafter, the current measuring unit 32 calculates the value of the excitation current in each coil based on the voltage drop detected by the current sensing unit 42.

The CPU 31 generates and outputs a control signal for controlling the driving voltage to the motor driving unit 41. The CPU 31 generates and outputs the control signal such that the excitation current has a predetermined square waveform, for example, at the time of the normal driving of the stepping motor 20. Note that the waveform of the control signal is not limited to this.

In the present embodiment, the CPU 31 performs, as the hold control unit, a startup control to move the rotor of the stepping motor 20 to the predetermined initial position during the hold period at the startup of the stepping motor 20 (hold control step) as described later. Also, the CPU 31 performs, as the normal control unit, the one-phase excitation operation of the stepping motor 20 after the end of the hold period (normal control step). The hold control step includes: from when the hold period is started until the hold period ends, gradually increasing the absolute value of the excitation current in the A-phase such that the amount of change in the excitation current per unit time is smaller than or equal to the first predetermined value; from when the hold period is started until the predetermined time elapses, gradually increasing the absolute value of the excitation current in the B-phase such that the amount of change in the excitation current per unit time is smaller than or equal to the first predetermined value; and by the time the hold period ends after the predetermined time has elapsed, causing the excitation current in the B-phase to reach zero. Alternatively, the normal control step includes starting the one-phase excitation operation of the stepping motor 20 such that the excitation current flows in the A-phase first with the same polarity as at the end of the hold period when the hold period ends. Note that the hold period is a period determined in advance, for example. In the startup control, the control signal is generated and outputted based on each control. In the present embodiment, the control signal is, for example, a pulse-width-modulated PWM signal.

The motor driving unit 41 applies the driving voltage, i.e., a pulse-width modulated signal (hereinafter, the pulse-width modulated signal may be referred to as PWM (Pulse Width Modulation) signal) to the coils of the stepping motor 20, based on the control signal supplied from the CPU 31.

When the driving voltage is applied to the coils of the stepping motor 20 in this way, the excitation current flows and the stator is magnetized. By alternately switching the direction of the excitation current flowing in each of the A-phase and the B-phase of the two-phase coils, the magnetic poles are excited at the stator change, whereby the rotor rotates.

Figure 2:
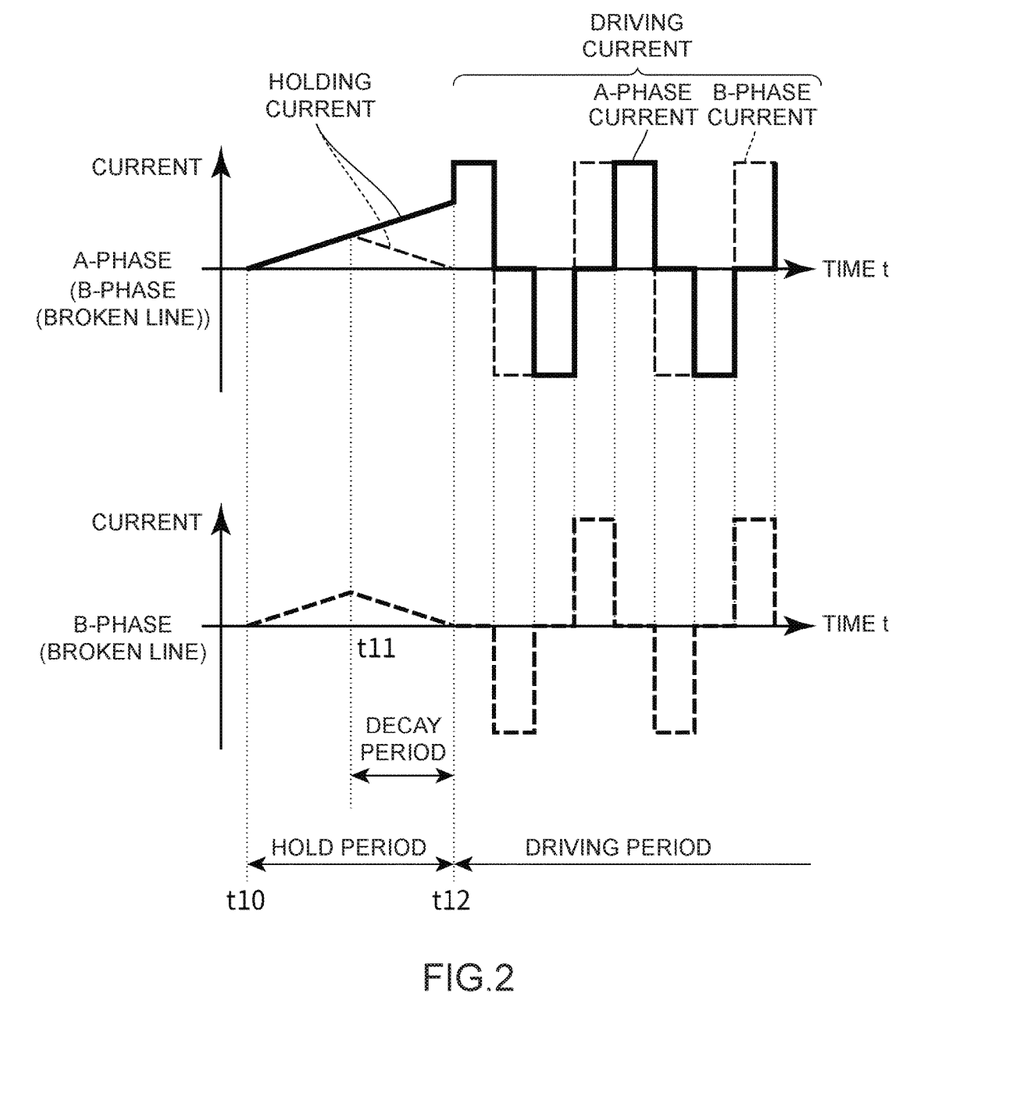
FIG. 2 is a view showing an example of waveforms of excitation currents.

FIG. 2 is a view showing an example of waveforms of excitation currents.

In FIG. 2, the horizontal axes represent time and the vertical axes represent values of the excitation current in the graphs. In the upper stage of FIG. 2, the excitation current in the A-phase is mainly shown together with the excitation current in the B-phase shown by a broken line. In the lower stage, the excitation current in the B-phase is shown.

As shown in FIG. 2, after the startup of the stepping motor 20 at a time t10, driving control is performed differently by the control device 10 for each of the hold period (from the time t10 to a time t12) and the driving period of the normal driving (after the time t12).

During the driving period after the end of the hold period, the driving voltage is applied from the control device 10 to the coils such that a normal excitation current (the normal excitation current may be referred to as the driving current) flows in the coils. In the present embodiment, the one-phase excitation operation of the stepping motor 20 is performed during the driving period. In FIG. 2, the waveform of the driving current is simplified. The waveform of the driving current may be a sine wave form having a predestined period.

Here, in the present embodiment, the CPU 31 performs the startup control to move the rotor of the stepping motor 20 to the predetermined initial position during the hold period at the startup of the stepping motor 20. In the startup control, the control is performed such that the holding current flows in both the A-phase and the B-phase.

[Description about Startup Control]

With reference to FIG. 2, a transition of the excitation current when the startup control as a specific example is performed will be described as follows. First, when the startup of the stepping motor 20 is initiated at the time t10, the control device 10 starts application of the driving voltage to the stepping motor 20 under the control of the CPU 31. During the hold period (from the time t10 to the time t12), the control device 10 performs control whereby the magnitude of the excitation current gradually changes over time. Such excitation current caused to flow in the coils to move the rotor to the initial position during the hold period may be referred to as a holding current. In the present embodiment, a length of the hold period is determined in advance and is 100 ms (100 milliseconds), for example. The length of the hold period may only be appropriately set by taking into consideration the time required for the rotor to move to the initial position and the vibration of the rotor to subside.

In the example shown in FIG. 2, during the hold period, the excitation current flows in a positive direction (upward direction in FIG. 2) in both the A-phase (an example of the one phase) and the B-phase (an example of the other phase) but is not limited to this. During the hold period, it is conceivable that the excitation current flows in the positive direction or the negative direction (direction opposite to the positive direction) in each of the A-phase and the B-phase, depending on a position of the rotor, or the like. That is, in addition to "positive in A-phase, positive in B-phase" shown in FIG. 2, there may be a case "positive in A-phase, negative in B-phase", "negative in A-phase, positive in B-phase", or "negative in A-phase, negative in B-phase". Hereinafter, unless otherwise specified, a case where the excitation current flows in the positive direction in both the A-phase and the B-phase, as shown in FIG. 2, will be described as a representative example for these cases.

In the present embodiment, from when the hold period is started at the time t10 until the hold period ends (the time t12), the CPU 31 gradually increases the absolute value of the excitation current in the one phase (here, the A-phase) such that the amount of change in the excitation current per unit time is smaller than or equal to a first predetermined value.

Also, in the present embodiment, from when the hold period is started at the time t10 until the predetermined time elapses (a time t11), the CPU 31 gradually increases the absolute value of the excitation current in the other phase (here, the B-phase) such that the amount of change in the excitation current per unit time is smaller than or equal to the first predetermined value.

Furthermore, the CPU 31 causes the excitation current in the B-phase to reach zero by the end of the hold period (the time t12) after the time t11 (the predetermined time has elapsed since the start of the hold period). In the present embodiment, after the time t11, the CPU 31 gradually decreases the absolute value of the excitation current in the B-phase such that the amount of change in the excitation current per unit time is smaller than or equal to a second predetermined value. The CPU 31 performs control of the excitation current in the B-phase such that the excitation current in the B-phase reaches zero at the time t12 when the hold period ends. The period from the time t11 to the time t12 may be referred to as a decay period of the excitation current in the B-phase.

A time from the time t10 to the time t11 when the decay period starts is a time set in advance and is, for example, 60 ms. The length of the hold period is set in advance as described above, the length of the decay period (from the time t11 to the time t12) can also be a time set in advance, and is, for example, 40 ms. The absolute value of the excitation current in the A-phase and the absolute value of the excitation current in the B-phase are controlled to be equal to each other from the time t10 to the time t11 when the decay period starts. That is, each of the excitation current in the A-phase and the excitation current of the B-phase linearly increases over time from the time t10 to the time t11.

On the other hand, when the decay period is initiated at the time t11, the absolute value of the excitation current in the A-phase linearly increases to a termination current value until the time t12, as will be described later. The absolute value of the excitation current in the B-phase linearly decreases to zero. As a result, at the time t12, the excitation current value in the A-phase becomes the termination current value and the excitation current in the B-phase becomes zero.

Such startup control is performed under the control of the CPU 31 as follows, for example. That is, a target current value is stored in advance in a memory 33, for example. The CPU 31 compares the excitation current value calculated by the current measuring unit 32, with the target current value stored in the memory 33. The CPU 31 adjusts a duty cycle for driving the stepping motor 20 such that the excitation current value to be calculated becomes close to the target current value. The CPU 31 generates a control signal corresponding to the adjusted duty cycle and supplies the control signal to the motor driving unit 41. As a result, in the motor driving unit 41, a driving voltage subjected to pulse width modulation with a duty cycle according to the control signal is generated. The target current value is stored in the memory 33, for example.

Figure 3:
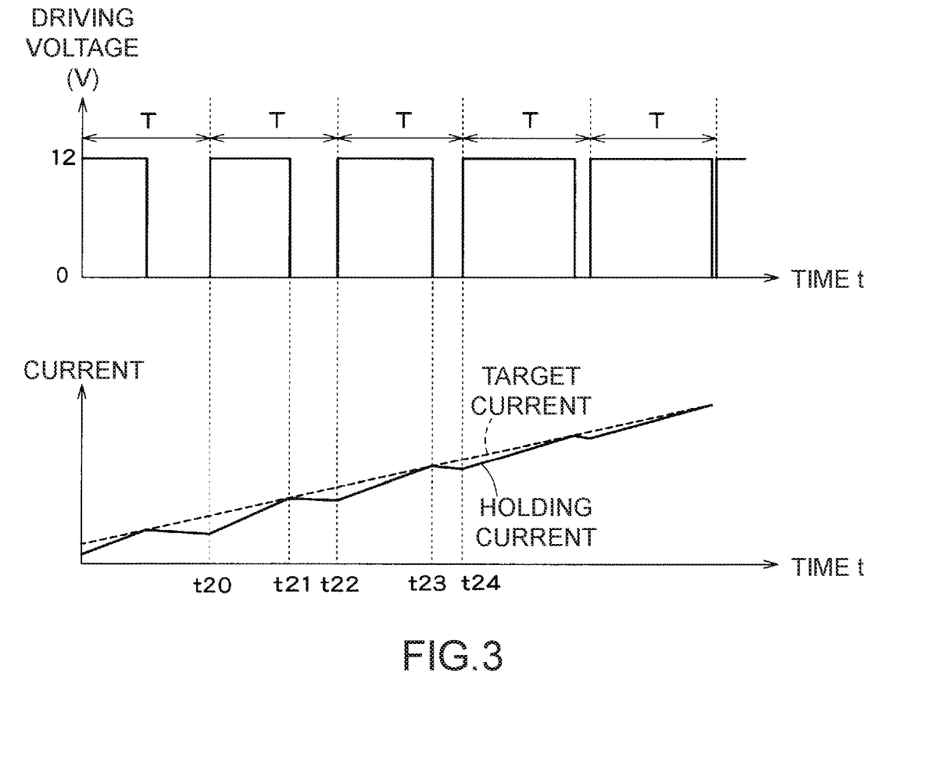
FIG. 3 is a view showing an example of startup control of a holding current.
Figure 4:
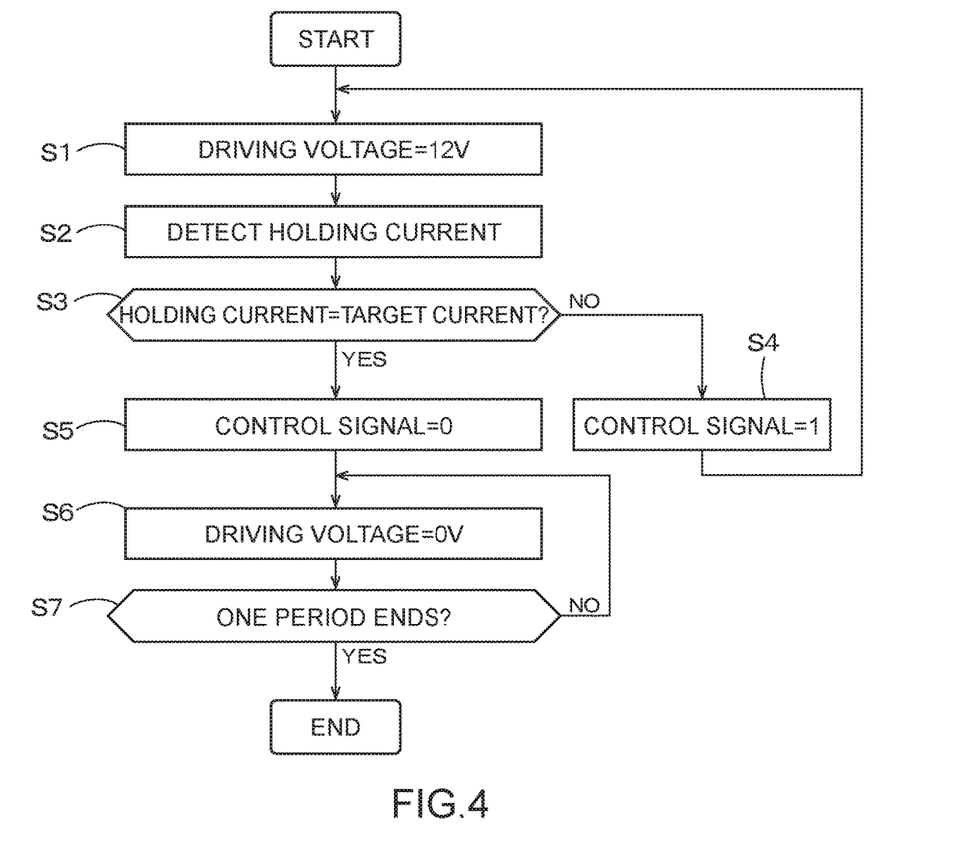
FIG. 4 is a flowchart illustrating an example of startup control by a control device.

FIG. 3 is a view showing an example of startup control of a holding current. FIG. 4 is a flowchart illustrating an example of startup control by the control device 10.

In FIG. 3, as for the A-phase, a waveform of the driving voltage applied by the motor driving unit 41 around the time t11 of FIG. 2, and waveforms of the target current and the holding current are shown on an enlarged scale. In this Figure, a period from a rise time of the driving voltage to the next rise time of the driving voltage, such as a period from a time t20 to a time t22 or a period from the time t22 to a time t24 corresponds to a period T of the PWM signal. In FIG. 4, a processing operation performed by the control device 10 for one period of the PWM signal is shown.

In the present embodiment, by applying the driving voltage subjected to pulse width modulation such that a duty cycle of the driving voltage increases over time to the coils in the hold period at the startup, the CPU 31 performs the startup control such that the holding current gradually increases or decreases over time. This will be described with reference to FIGS. 3 and 4.

First, the CPU 31 switches the control signal from a low level to a high level (a first value) at the time t20, the start of the period T (Step S1). In response to this transition, the motor driving unit 41 switches the driving voltage from a low level to a high level. For example, the low level and the high level of the driving voltage correspond to 0 V and 12 V, respectively. Next, the current sensing unit 42 and the current measuring unit 32 detect the value of the holding current flowing in the coils (Step S2). During a period from the time t20 to immediately before a time t21, since the holding current is lower than the target current ("NO" in Step S3), the CPU 31 sets the control signal at the high level (the first value; expressed as "1" in FIG. 4) (Step S4). In this case, the driving voltage is maintained at the high level (Step S1), and the duty cycle of the PWM signal (the ratio of an ON period of the PWM signal with respect to each period) increases. When the driving voltage is at the high level, the excitation current flowing in the coils increases.

When the holding current reaches the target current at the time t21 ("YES" in Step S3), the CPU 31 sets the control signal to the low level (a second value; expressed as "0" in FIG. 4) (Step S5). In response to this transition, the motor driving unit 41 sets the driving voltage to the low level (Step S6), and then application of the driving voltage to the coils is stopped. Thereafter, the driving voltage is maintained at the low level until the time t22, which is the end of the period T, (Steps S6 and S7). The ratio of the period from the time t20 to the time t21 when the driving voltage is at the high level to the period T is the duty cycle of the PWM signal.

During the period from the time t21 to the time t22 when the driving voltage is at the low level, although voltage is not applied at both ends of each coil, the inductance component of the coil causes the holding current to gradually decrease as shown in FIG. 3. As a result, the holding current becomes lower than the target current.

Thereafter, at the time t22, which is the start of the next period, the control device 10 starts the processing operation of FIG. 4, and the motor driving unit 41 sets the driving voltage to the high level again. As a result, the holding current starts to increase. During the period from the time t22 to the time t24, the target current is higher than that in the period from the time t20 to the time t22. For this reason, during a period from the time t22 to a time t23 longer than the period from the time t20 to the time t21, the driving voltage is set at the high level.

In this way, during the hold period of FIG. 2, the processing operation of FIG. 4 is repeatedly performed. That is, when the value of the holding current does not reach the value of the target current, the CPU 31 sets the control signal at the high level such that the duty cycle of the driving voltage becomes larger than that before this setting, and when the value of the holding current reaches the value of the target current, the CPU 31 switches the control signal to the low level such that application of the driving voltage to the coils is stopped. As a result, in the A-phase, the duty cycle of the PWM signal gradually increases, and thus the holding current is generated such that the holding current linearly increases according to the target current as shown in FIG. 2.

As for the B-phase, the target current gradually decreases after the time t11. The duty cycle of the PWM signal therefore gradually decreases and the holding current gradually decreases.

Incidentally, as shown in FIG. 3, strictly, the holding current increases or decreases with ripples in a sawtooth shape. However, the period T of the PWM signal is sufficiently shorter than the hold period (from the time t10 to the time t12). For example, the hold period is 100 ms, whereas the period T of the PWM signal is about 0.1 ms. For this reason, it can be said that the holding current increases or decreases gradually and linearly.

Referring to FIG. 2, in the present embodiment, the target current value is set for each of the A-phase and the B-phase. The target current value of the A-phase is set such that the current linearly increases over time, and the excitation current value of the A-phase reaches a predetermined value (termination current value) at the end of the hold period. In other words, the control is performed such that timing when the holding current value of the A-phase reaches the termination current value and the end of the hold period become identical.

The termination current value is set, for example, in a range from 30% to 100% of the maximum value of the driving current (the maximum value of the excitation current caused to flow in the coils after the end of the hold period at the startup) to attract the rotor to the initial position. For example, it is assumed that the termination current value at the start (the startup start) is set to the value of 70% of the maximum value of the driving current. In this case, during the hold period, control is performed such that the value of the holding current gradually rises (increases) from the value of 0% of the maximum value of the driving current to the value of 70% of the maximum value of the driving current, that is, the termination current value. When the value of the holding current reaches the termination current value, whereby the hold period at the startup ends, the driving period starts.

In the driving period, the CPU 31 suddenly increases the excitation current value from the termination current value and starts stable, normal driving in a range where the excitation current value is the maximum value (the value of 100%) of the driving current.

Here, in the present embodiment, when the hold period ends, the CPU 31 starts the one-phase excitation operation of the stepping motor 20 such that the excitation current flows first in the A-phase (an example of the one phase) with the same polarity as at the end of the hold period.

That is, when the excitation current flows in the A-phase in the positive direction at the end of the hold period, the one-phase excitation operation is started with an energized phase where the excitation current flows in the A-phase in the positive direction. In this first energized phase, the excitation current in the B-phase (an example of the other phase) is zero.

When the excitation current flows in the A-phase in the negative direction (direction opposite to the positive direction) at the end of the hold period, the one-phase excitation operation is started with an energized phase where the excitation current flows in the A-phase in the negative direction. In this first energized phase, the excitation current in the B-phase is zero.

Alternatively, when the excitation current flows in the B-phase in the positive direction at the end of the hold period, the one-phase excitation operation may be started with an energized phase where the excitation current flows in the positive direction in the B-phase. At this time, in this first energized phase, the excitation current in the A-phase needs to be zero.

When the excitation current flows in the B-phase in the negative direction (direction opposite to the positive direction) at the end of the hold period, the one-phase excitation operation may be started with an energized phase where the excitation current flows in the negative direction in the B-phase. At this time, in this first energized phase, the excitation current in the A-phase needs to be zero.

As described above, by performing the control at the hold period at the startup such that the magnitude of the excitation current (the holding current) gradually increases, even if the rotor is at any position before startup, the rotor is slowly attracted to the position (initial position) facing the stator. The holding current in the one phase (the A-phase in this example) increases to the termination current value, and the holding current in the other phase (the B-phase in this example) decreases to zero, thereby surely attracting the rotor to the initial position. After the end of the hold period, the normal driving operation is performed, whereby the stepping motor 20 surely operates. During the hold period, when the holding current in the one phase and the holding current in the other phase increase, control is performed such that the amount of change in each holding current per unit time is smaller than or equal to the first predetermined value. When the first predetermined value is large, the excitation current suddenly changes and thereby the sound may be generated by the rotor moving in a short time. On the other hand, when the first predetermined value is small, the excitation current slowly changes, and thereby it takes time to move the rotor. As a result, the hold period is made longer, and it takes time to move the rotor to the initial position. Therefore, the first predetermined value is set to an appropriate value by taking the above into consideration. For this reason, the rotor does not move from the position before startup to the initial position, at a high speed, and it is therefore possible to suppress generation of noise such as vibration sound and impact sound from the stepping motor 20.

Further, in the present embodiment, when the hold period where the two-phase excitation is performed is switched to the driving period where the one-phase excitation operation is performed, generation of abnormal sound is suppressed. That is, during the hold period, at first, the two-phase excitation is performed such that the rotor is attracted to the initial position, but in the middle of the hold period, the decay period where the excitation current in the B-phase is gradually decreased to reach zero is initiated. Thus, at the time t12 when the hold period ends, the position of the rotor is at a position when the excitation current flows only in the A-phase in the first energized phase at the start of the one-phase excitation operation. Therefore, the hold period is switched to the driving period at the time t12, and at the moment the one-phase excitation operation is started, the rotor barely rotates. Consequently, it is possible to suppress generation of abnormal noise resulting from the sudden rotation of the rotor. In devices using the stepping motor 20, sound can be better suppressed. Also, regarding the devices using the stepping motor 20, it is possible to suppress generation of sound unpleasant to users. During the decay period, the excitation current in the B-phase is gradually decreased such that the amount of change in the excitation current per unit time is smaller than or equal to a second predetermined value. Therefore, the rotor does not suddenly rotate during the decay period, and thereby it is possible to surely suppress generation of abnormal sound. In addition, the second predetermined value may only be set such that the excitation current in the B-phase becomes zero by the time the rotor reaches the initial position (that is, by the time the excitation current in the A-phase reaches the termination current value).

Figure 5:
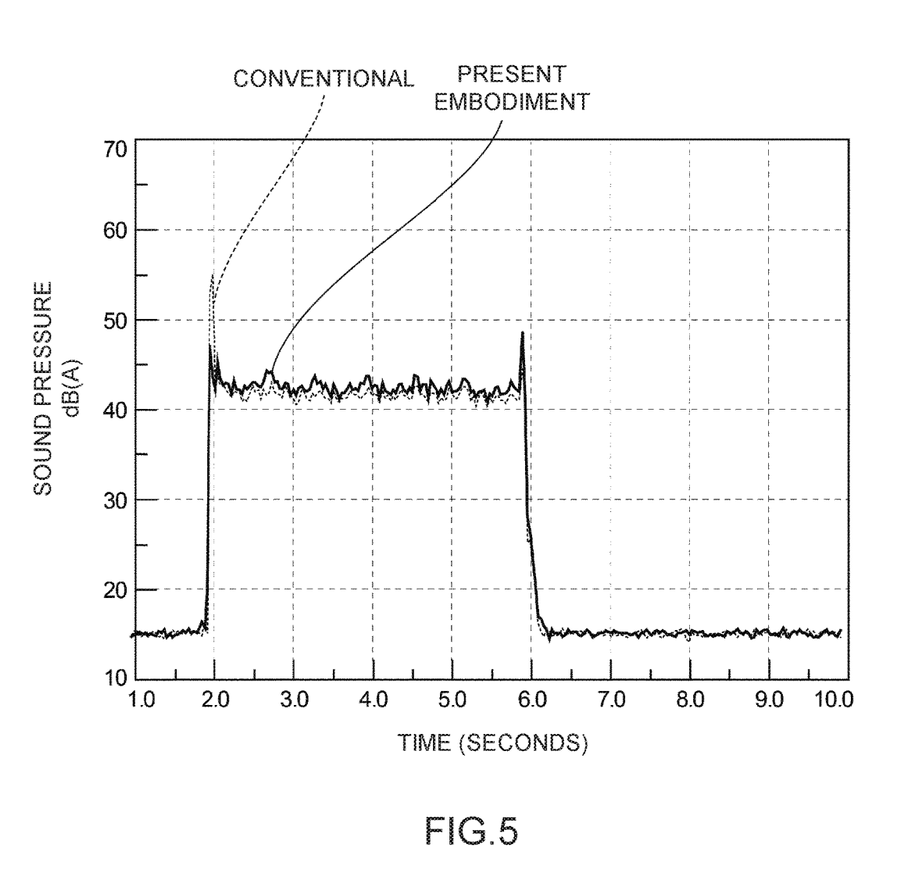
FIG. 5 is a graph showing an example of the relationship between the lapse of time and the magnitude of the sound pressure generated by a stepping motor.

FIG. 5 is a graph showing an example of the relationship between the lapse of time and sound pressure level generated in the stepping motor 20.

In FIG. 5, the solid line shows a measured value of the sound pressure level in the present embodiment, and the broken line shows the measured values of the sound pressure level in a conventional case where the excitation current flows in the two phases until the end of the hold period and the decay period is not provided. Conventionally, as shown by the broken line of FIG. 5, when sound is generated in the stepping motor 20, there is a peak of sound pressure particularly at the startup where the sound pressure rises, whereby it can be found that the abnormal sound is generated. On the other hand, in the present embodiment, the aforementioned peak of the sound pressure at the startup is suppressed as shown by the solid line. Thus, it is possible to suppress generation of the abnormal sound.

Figure 6:
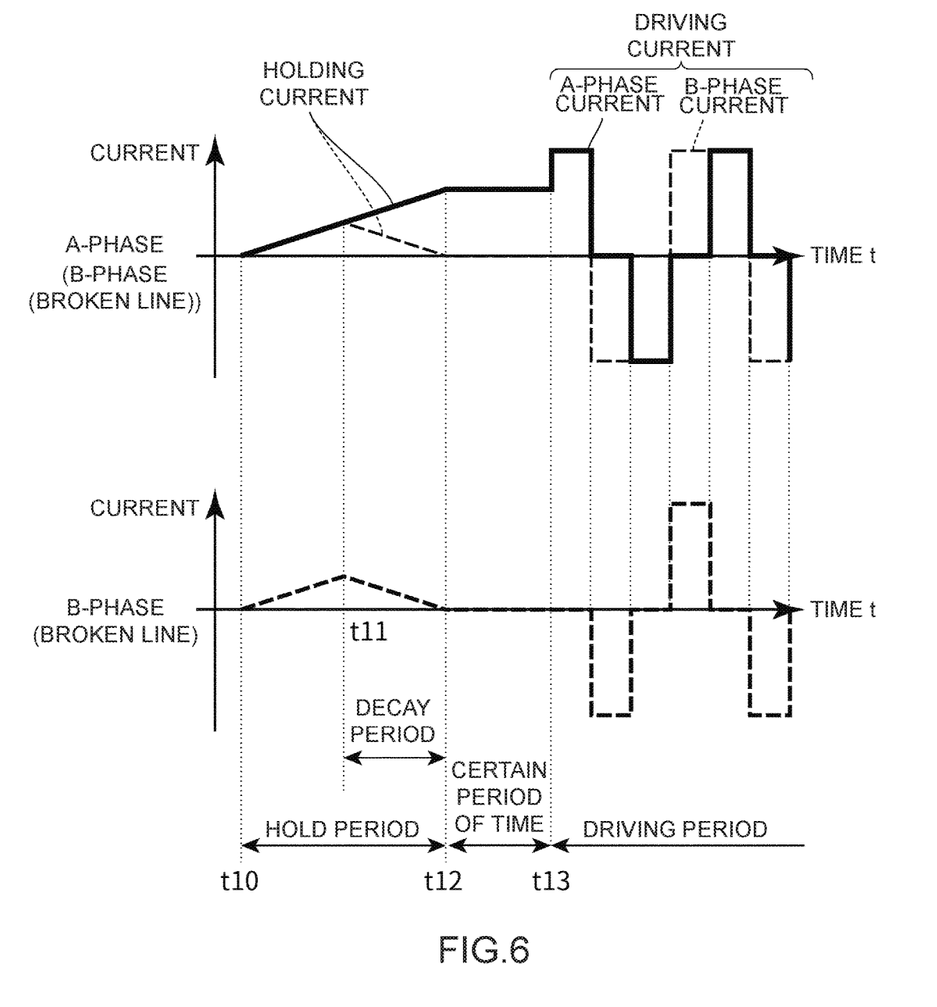
FIG. 6 is a view showing an example of waveforms of excitation currents in a modification of the present embodiment.

FIG. 6 is a view showing an example of waveforms of excitation currents according to a modification of the present embodiment.

As shown in FIG. 6, a period where the excitation current value at the end of the hold period is maintained constant for a period of time may be inserted between the end of the hold period and the start of the normal driving period.

In FIG. 6, an example where the hold period is from the time t10 to the time t12, and the driving period is started at time t13 when a predetermined period (certain period of time) elapses after the time t12 is shown. Here, in each of the A-phase and the B-phase, magnitude of the excitation current at the end of the hold period (the termination current value for the A-phase and zero for the B-phase) may be maintained constant between the time t12 and the time t13. As a result, as in the above description, the rotor does not suddenly rotate when the one-phase excitation operation is performed, whereby the generation of the abnormal sound is suppressed. Note that the above predetermined period may be regarded as included in the hold period.

[Description about Variation Pattern of Holding Current in Startup Control]

In the above-described embodiment, the startup control is performed such that each of the holding current in the A-phase and the holding current in the B-phase linearly varies during the hold period. However, such a variation pattern of the holding current is not limited to the linear variation pattern. For example, the variation pattern of the holding current in each phase may be set to vary in a straight linear shape, a stepwise shape, a downwardly convex curve shape, or an upwardly convex curve shape in the relation between the lapse of time and the magnitude of the excitation current as shown in FIG. 2. This variation pattern of the holding current can be set by appropriately setting the target current value.

For example, during the decay period, when the holding current gradually increases in the one phase (for example, the A-phase), the variation pattern of the holding current in the other phase (for example, the B-phase), on the other hand, can be set to various settings. The holding current in the other phase is required to be zero at the end of the hold period.

Figure 7:
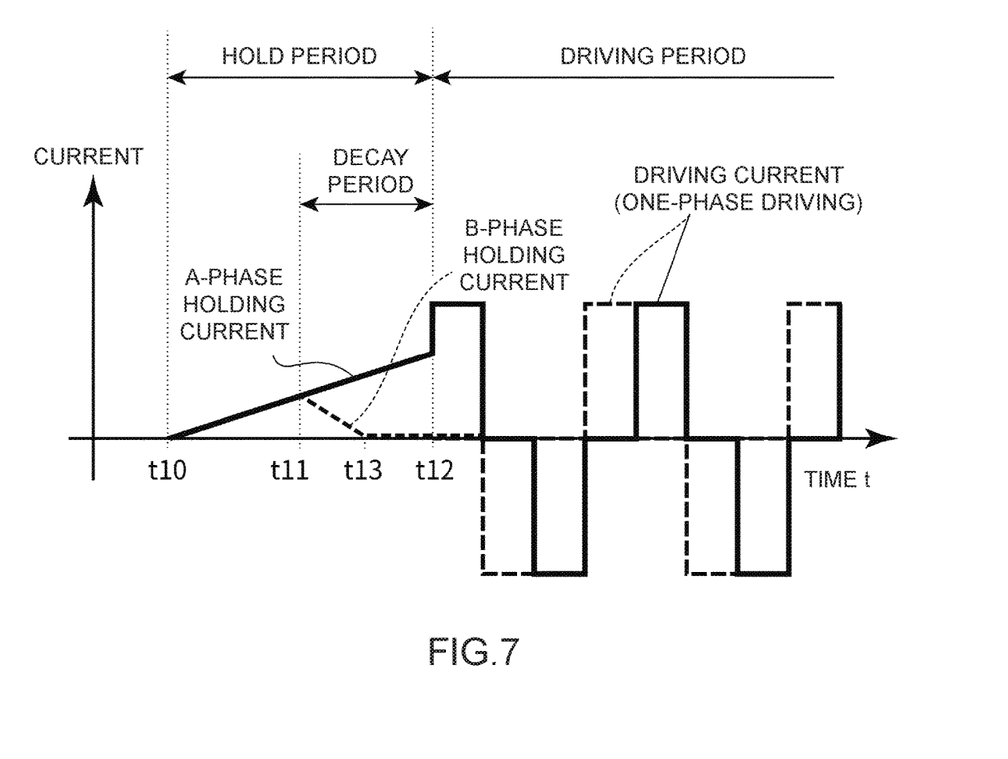
FIG. 7 is a first view showing a variation pattern of a holding current according to the modification of the present embodiment.
Figure 8:
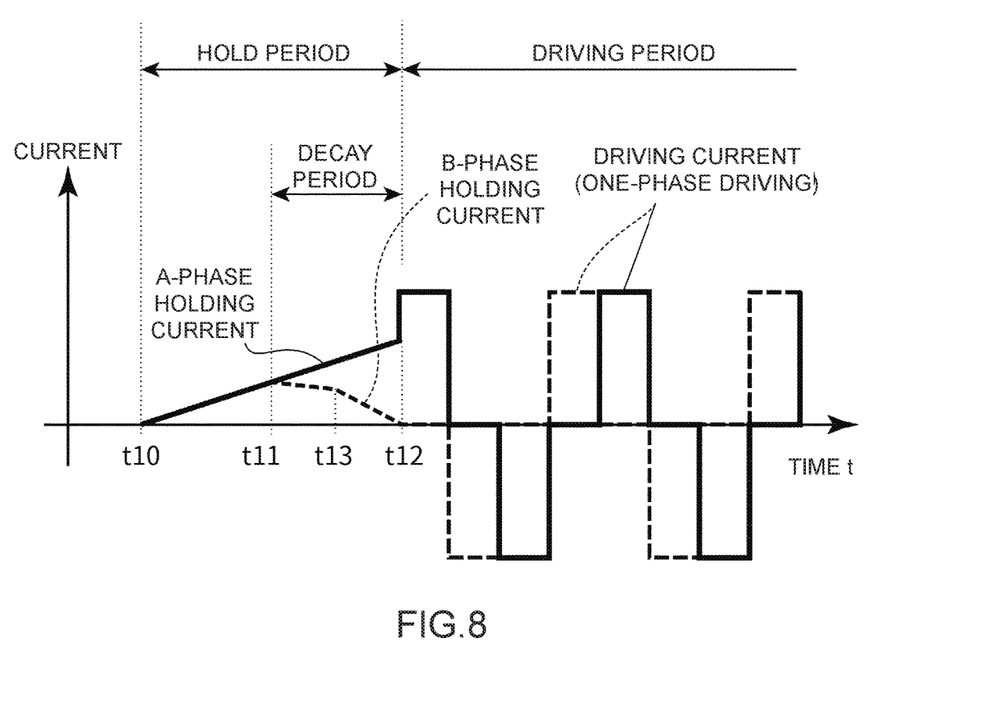
FIG. 8 is a second view showing a variation pattern of a holding current according to the modification of the present embodiment.
Figure 9:
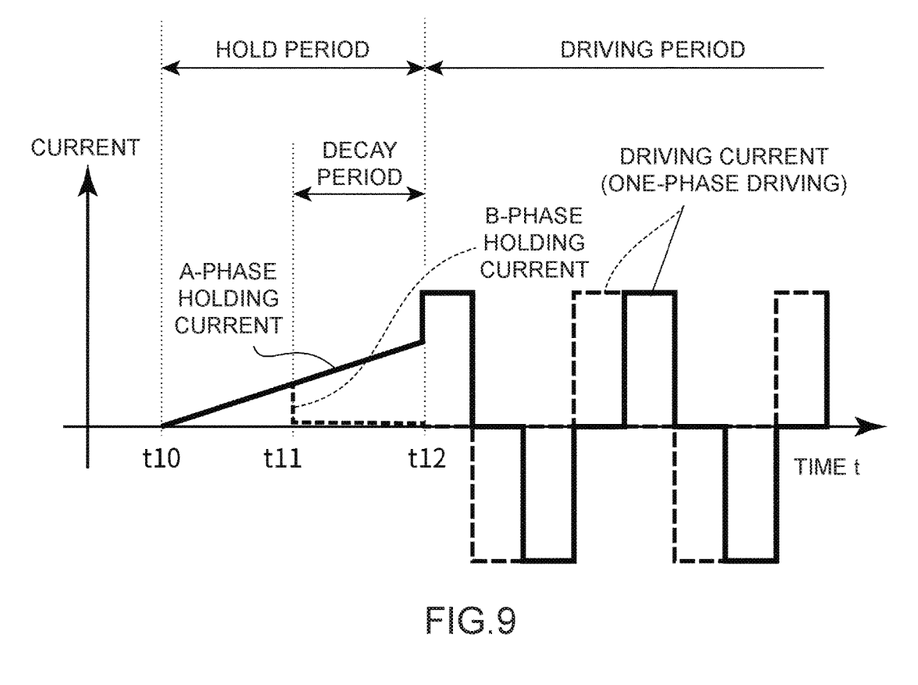
FIG. 9 is a third view showing a variation pattern of a holding current according to the modification of the present embodiment.

FIG. 7 is a first view showing a variation pattern of a holding current according to a modification of the present embodiment. FIG. 8 is a second view showing a variation pattern of a holding current according to a modification of the present embodiment. FIG. 9 is a third view showing a variation pattern of a holding current according to a modification of the present embodiment.

As in FIG. 2, in FIGS. 7, 8, and 9, variations in the magnitude of the excitation current in each phase are shown in the case where the excitation current flows in both the A-phase (an example of the one phase) and B-phase (an example of the other phase) in the positive direction. The solid lines show the excitation current in the A-phase, and the broken lines show the excitation current in the B-phase. Note that, in each view, the excitation current in the A-phase is similar to the above-mentioned embodiment.

As shown in FIG. 7, the startup control may be performed such that the holding current in the B-phase reaches zero before the hold period ends. For example, the holding current in the B-phase gradually decreases toward zero from the time t11 when the decay period is started, becomes zero at a time t13 during the decay period, and thereafter is maintained at zero from the time t13 to the time t12 when the hold period ends.

Alternatively, as shown in FIG. 8, the amount of change (rate of change) in the holding current in the B-phase per unit time may vary during the decay period. For example, the holding current in the B-phase may decrease at a predetermined rate of change from the time t11 to the time t13 during the decay period, may decrease at a larger rate of change than the predetermined rate of change from the time t13 to the time t12, and may become zero at the time t12.

Furthermore, as shown in FIG. 9, the holding current in the B-phase may decrease to zero at the time t11 the decay period is started. At this time, the holding current in the B-phase can be required to be maintained at zero from the time t11 to the time t12 when the hold period ends. In other words, during the hold period, the two-phase excitation state for attracting the rotor to the initial position may be switched to the one-phase excitation state for the one-phase excitation operation at the time t11.

In any cases where the holding current in the B-phase decreases during the decay period in this way, as with the above-mentioned embodiment, generation of the abnormal noise is suppressed when the hold period where the two-phase excitation is performed is switched to the driving period where the one-phase excitation operation is performed.

[Addition]

The present disclosure is not limited to the configurations of the above-described embodiments. The features of the embodiments may be appropriately combined such that any other control device for a stepping motor is formed.

The excitation current in the other phase may not be exactly zero but should be approximately zero, at the end of the hold period when the excitation current value of the one phase reaches the termination current value. Also, during the hold period, the holding current in the one phase may not match the holding current in the other phase by the time the decay period is started. For example, the holding current in the one phase may be higher than the holding current in the other phase and vice versa. The holding currents in the two phases need only be controlled such that a rotor is slowly attracted to the initial position, not to suddenly rotate the rotor.

The flowchart mentioned above is exemplary and not limited to this flowchart. For example, another process may be inserted between each step, or processes may be parallelized.

Processes of the embodiments described above may be performed by software or may be performed by a hardware circuit. That is, at least a part of each component of the motor driving control device may be configured to be processed by software, not by hardware.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

What is claimed is:

1. A control device for a stepping motor configured to rotate a rotor by controlling an excitation current in each of one phase and another phase of two-phase coils, the control device comprising:

a control circuit configured to:
move a rotor of the stepping motor to a predetermined initial position during a hold period at a startup of the stepping motor; and
perform one-phase excitation operation of the stepping motor after the end of the hold period, wherein
from when the hold period is started until the hold period ends, the control circuit gradually increases an absolute value of the excitation current in the one phase such that the amount of change in the excitation current per unit time is smaller than or equal to a first predetermined value,
from when the hold period is started until a predetermined time elapses, the control circuit gradually increases an absolute value of the excitation current in the other phase such that the amount of change in the excitation current per unit time is smaller than or equal to the first predetermined value, and by the time the hold period ends after the predetermined time has elapsed, the control circuit causes the excitation current in the other phase to reach zero, and wherein when the hold period ends, the control circuit starts to perform one-phase excitation operation of the stepping motor such that the excitation current flows in the one phase first with the same polarity as at the end of the hold period.

2. The control device for the stepping motor according to claim 1, wherein after the predetermined time has elapsed, the control circuit gradually decreases the absolute value of the excitation current in the other phase such that the amount of change in the excitation current per unit time is smaller than or equal to a second predetermined value.

3. The control device for the stepping motor according to claim 1, wherein the control circuit performs control of the excitation current in the other phase such that the excitation current in the other phase reaches zero when the hold period ends.

4. The control device for the stepping motor according to claim 1, wherein the control circuit performs control of the excitation current in the other phase such that the excitation current in the other phase reaches zero before the hold period ends.

5. The control device for the stepping motor according to claim 1, wherein the control circuit performs control such that the absolute value of the excitation current in the one phase and the absolute value of the excitation current in the other phase are equal to each other until the predetermined time elapses.

6. A control method of a stepping motor configured to rotate a rotor by controlling an excitation current in each of one phase and another phase of two-phase coils, the method comprising:

a hold control step of moving the rotor of the stepping motor to a predetermined initial position during a hold period at a startup of the stepping motor; and a normal control step of performing one-phase excitation operation of the stepping motor after the end of the hold period, wherein the hold control step comprises:

from when the hold period is started until the hold period ends, gradually increasing an absolute value of the excitation current in the one phase such that the amount of change in the excitation current per unit time is smaller than or equal to a first predetermined value;

from when the hold period is started until a predetermined time elapses, gradually increasing an absolute value of the excitation current in the other phase such that the amount of change in the excitation current per unit time is smaller than or equal to the first predetermined value; and by the time the hold period ends after the predetermined time has elapsed, causing the excitation current in the other phase to reach zero, and wherein the normal control step comprises starting to perform one-phase excitation operation of the stepping motor such that the excitation current flows in the one phase first with the same polarity as at the end of the hold period when the hold period ends.

* * * * *